United States Patent
Oota et al.

[11] Patent Number: 5,821,327
[45] Date of Patent: Oct. 13, 1998

[54] PROCESS FOR PREPARING POLYLACTIC ACID

[75] Inventors: Masaaki Oota; Masahiro Ito, both of Kyoto, Japan

[73] Assignee: Shimadzu Corporation, Kyoto, Japan

[21] Appl. No.: 819,631

[22] Filed: Mar. 17, 1997

[30] Foreign Application Priority Data

Mar. 22, 1996 [JP] Japan ............................. 8-93104

[51] Int. Cl.$^6$ .................................................. C08G 63/08
[52] U.S. Cl. ........................ 528/354; 528/310; 528/322; 528/357; 528/358; 528/361
[58] Field of Search .................... 528/354, 357, 528/358, 361, 310, 322

[56] References Cited

U.S. PATENT DOCUMENTS 2,857,274 10/1958 Land et al. .
2,857,276 10/1958 Land et al. .
4,057,537 11/1977 Sinclair .

FOREIGN PATENT DOCUMENTS 0 261 572   3/1988   European Pat. Off. .
2 008 135   5/1979   United Kingdom .

Primary Examiner—Duc Truong
Attorney, Agent, or Firm—Armstrong, Westerman, Hattori, McLeland & Naughton

[57] ABSTRACT

The polymerization reaction is conducted by heating a lactide, a cyclic imide compound (e.g. succinimide, etc.) and a polymerization catalyst (e.g. tin octylate, etc.) at 100–190° C. with stirring under a nitrogen gas flow. It is preferred that an amount of the cyclic imide compound is from 1 to 35% by mole based on the lactide. Even if an amount of the polymerization catalyst is small, e.g. 0.00001–0.1 mole %, based on the lactide, polylactic acid can be efficiently prepared. It is possible to avoid remains of the catalyst in the polymer and coloring of the polymer.

7 Claims, 2 Drawing Sheets

PROCESS FOR PREPARING POLYLACTIC ACID

BACKGROUND OF THE INVENTION

1. Field of the Invention

The present invention relates to a process for preparing polylactic acid. More particularly, it relates to a process for preparing polylactic acid according to a ring-opening polymerization process of a cyclic dimer lactide of lactic acid.

2. Description of Related Art

An enormous amount of plastic products such as polyethylene, polypropylene, polystyrene, polyethylene terephthalate, polyvinyl chloride and the like have recently been used, and disposal of waste matters of them has attracted special interest recently as one of environmental problems. That is, disposal of waste matters at present is exemplified by disposal by incineration, disposal by laying and the like. For example, when polyethylene is incinerated, an incinerator is damaged because of it's high combustion calorie, thereby reducing a life. When polyvinyl chloride is incinerated, a harmful gas is evolved. On the other hand, when the plastic products are laid, the place is limited. When they are discarded in a natural environment, they are hardly degradated biologically by microorganisms because of extremely high chemical stability so that they are remained semipermanently. Therefore, the scene is damaged and a problem of contaminating an oceanic life's living environment occurs.

In order to solve these problems, a biodegradable polymer has been developed for a conventional plastic. There is polylactic acid as one of biodegradable polymers. Polylactic acid is hydrolyzed or degradated by microorganisms in a natural environment, and is finally degradated into carbon dioxide and water. Even if polylactic acid is incinerated, an incinerator is not damaged because of it's low combustion calorie, and a harmful gas is not also evolved. In such way, the above problem of disposal of waste matters is considerably alleviated. Since polylactic acid is synthesized from lactic acid, obtained from regeneratable vegetable resources, as a raw material, it is promising in view of resources in comparison with a conventional plastic synthesized from a petroleum raw material. Furthermore, it is a feature of polylactic acid that transparency is better than that of the other biodegradable polymer.

There have been two processes in the synthesis of polylactic acid, heretofore. That is, a direct process of directly dehydrating condensing a lactic monomer, and a process of firstly synthesizing a cyclic lactide (dimer) from lactic acid and then ring-opening polymerizing the lactide.

For example, various synthesis, purification and polymerization operations of the lactide are described in literatures such as U.S. Pat. No. 4,057,537, EP-A-261572, Polymer Bulletin, 14, 491–495 (1985), Makromole Chem., 187, 1611–1628 (1986) and the like.

The ring-opening polymerization process has hitherto been conducted by mixing a lactide with a polymerization catalyst, followed by heating to 180°–220° C. (cf. Japanese Examined Patent Publication No. 56-14688). Alcohol, water, hydroxyl acid and the like may be sometimes added as the polymerization initiator.

In this polymerization process, it is preferred that the amount of the polymerization catalyst is small and the polymerization temperature is low. This reason is as follows. That is, when the amount of the polymerization catalyst is large, the cost of the catalyst itself is high and depolymerization is liable to occur in the polymerization reaction system. If a heavy metal catalyst such as tin is remained in the polymer, it becomes impossible to use the polymer for applications such as packaging container of foods. When the polymerization temperature is high, the polymerization reaction generally proceeds rapidly but the polymer is liable to be colored.

However, a conventional process had a problem that the polymerization reaction rate is drastically lowered when the amount of the polymerization catalyst is small based on the lactide or the polymerization temperature is low.

SUMMARY OF THE INVENTION

Thus, an object of the present invention is to solve the above problems of a conventional technique, thereby providing a process for efficiently preparing polylactic acid even under the mild conditions of low polymerization catalytic amount and low polymerization temperature.

The present inventors have intensively studied. As a result, it has been found that a cyclic imide compound is excellent as a polymerization initiator. Thus, the present invention has been accomplished.

That is, the present invention directs to a process for preparing polylactic acid by ring-opening polymerization of a lactide in the presence of a polymerization catalyst, said process comprising adding a cyclic imide compound to a polymerization reaction system. The lactide is a cyclic dimer of lactic acid. In the present invention, polylactic acid also includes lactic acid copolymer, in addition to lactic acid homopolymer.

According to the present invention, the cyclic imide compound is added to the polymerization reaction system and, therefore, polylactic acid can be efficiently prepared even under the mild conditions of low polymerization catalytic amount and low polymerization temperature. Accordingly, depolymerization of the polymer can be inhibited, and remains of the catalyst in the polymer and coloring of the polymer can be avoided.

In the present process, an amount of the cyclic imide compound is preferably from 1 to 35% by mole based on the lactide.

In the present process, the cyclic imide compound is preferably at least one selected from the group consisting of succinimide, glutarimide and phthalimide.

In the present process, the cyclic imide compound is more preferably succinimide.

Polylactic acid obtained by the process of the present invention is very useful as a biodegradable resin for packaging, medical and agricultural applications.

DETAILED DESCRIPTION OF THE INVENTION

Figure 1:
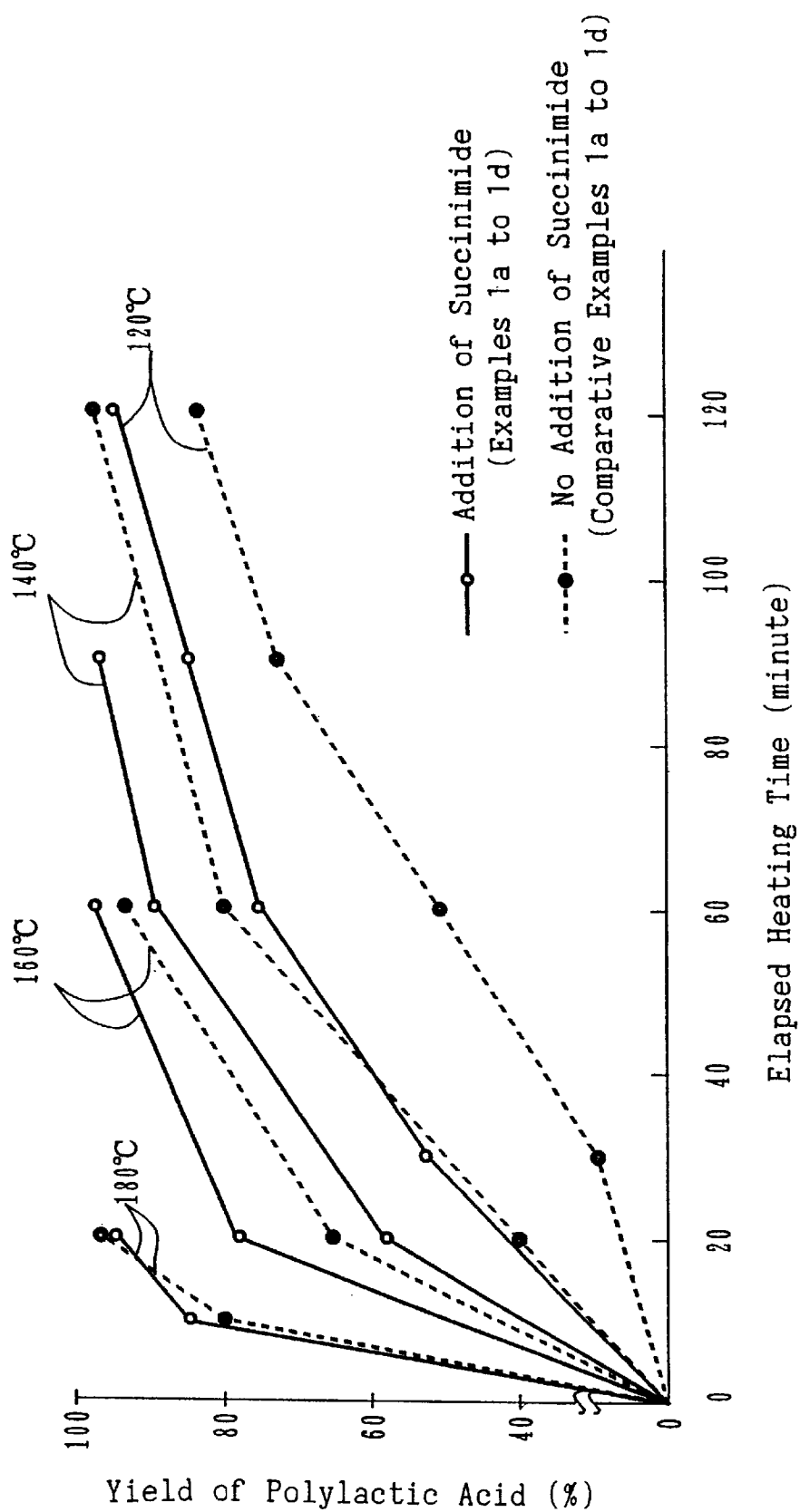
FIG. 1 shows the results of Examples 1a to 1d and Comparative Examples 1a to 1d, and is a graph illustrating the relation of the yield of polylactic acid (%) to the elapsed heating time (minute).

In the present invention, any lactide of L-lactide, D-lactide, DL-lactide, mesolactide and a mixture thereof may be used. When using the lactide other than L-lactide, the proportion thereof is preferably selected so that a constituent content of a D-lactic acid unit in the resulting poly DL-lactic acid becomes 40% by mole at most. When the content of the D-lactic acid unit exceeds 40% by mole, the molecular weight of the resulting poly DL-lactic acid is drastically lowered not more than 10,000. It is more preferred to select the proportion so that the content of the D-lactic acid unit becomes 20% by mole at most.

In the present invention, it is also possible to use other components capable of copolymerizing with the lactide, i.e. dicarboxylic acid, polyhydric alcohol, hydroxycarboxylic acid and lactone, which have two or more ester bond-forming functional groups.

Examples of the dicarboxylic acid include succinic acid, azelaic acid, sebacic acid, terephthalic acid, isophthalic acid and the like.

Examples of the polyhydric alcohol include aromatic polyhydric alcohol such as adduct of bisphenol with ethylene oxide and the like; aliphatic polyhydric alcohol such as ethylene glycol, propylene glycol, butanediol, hexanediol, octanediol, glycerine, sorbitan, trimethylolpropane, neopentyl glycol and the like; and ether glycol such as diethylene glycol, triethylene glycol, polyethylene glycol, polypropylene glycol and the like.

Examples of the hydroxycarboxylic acid include glycolic acid, hydroxybutylcarboxylic acid, those described in Japanese Laid-open Patent Publication No. 6-184417 and the like.

Examples of the lactone include glycolide, ε-caprolactoneglycolide, ε-caprolactone, β-propiolactone, δ-butyrolactone, β- or γ-butyrolactone, pivalolactone, δ-valerolactone and the like.

In order to obtain a copolymer of high polymerization degree, there may be used those having large moleecular weight to be added as the copolymerization component, such as polyethylene adipate, polyhexamethylene adipate, polycaprolactone, polyglycolic acid, polyhydroxybutylate; or copolymer of alkylene terephthalate, alkylene isophthalate, alkylene sulfoisophthalate and aliphatic polyester; or polyethylene glycol, polypropylene glycol, polytetramethylene glycol and a copolymer thereof.

These other components capable of copolymerizing with lactide can be used alone or in combination thereof. The copolymerization component having biodegradability is preferred.

In the process of the present invention, a cyclic imide compound is added to a polymerization reaction system as a polymerization initiator. Examples of the cyclic imide compound include succinimide, glutarimide, phthalimide and the like. Among them, succinimide is preferred in view of the cost. It is considered that the cyclic imide compound serves as the polymerization initiator in the ring-opening polymerization reaction system of the lactide. It is also possible to control the molecular weight of polylactic acid by changing the amount of the cyclic imide compound added.

The amount of the cyclic imide compound used is not specifically limited, but is preferably from 1 to 35% by mole based on the lactide. When the amount is less than 1% by mole, the effect of improving the polymerization rate is small. On the other hand, when the amount exceeds 35% by mole, the molecular weight of polylactic acid is drastically lowered and, therefore, it is not preferred. More preferred amount of the cyclic imide compound is from 1 to 25% by mole based on the lactide.

In the present invention, the polymerization catalyst is not specifically limited, but a catalyst comprising a metal selected from the group consisting of Group IA, IIIA, IVA, IIB, IVB and VA of the periodic table, or a compound thereof, is used.

Examples of the catalyst comprising the metal belonging to Group IA, or a compound thereof, include hydroxide of alkali metal (e.g. sodium hydroxide, potassium hydroxide, lithium hydroxide, etc.), salt of alkali metal and weak acid (e.g. sodium lactate, sodium acetate, sodium carbonate, sodium octylate, sodium stearate, potassium lactate, potassium acetate, potassium carbonate, potassium octylate, etc.) and alkoxide of alkali metal (e.g. sodium methoxide, potassium methoxide, sodium ethoxide, potassium ethoxide, etc.).

Examples of the catalyst comprising the metal belonging to Group IIIA, or a compound thereof, include aluminium ethoxide, aluminium isopropoxide, aluminium oxide, aluminium chloride and the like.

Examples of the catalyst comprising the metal belonging to Group IVA, or a compound thereof, include organotin catalyst (e.g. tin lactate, tin tartrate, tin dicaprylate, tin dilaurate, tin dipalmitate, tin distearate, tin dioleate, tin α-naphthoate, tin β-naphthoate, tin octylate, etc.), powdered tin, tin oxide and the like.

Examples of the catalyst comprising the metal belonging to Group IIB, or a compound thereof, include zinc dust, zinc halide, zinc oxide, organozinc compound and the like.

Examples of the catalyst comprising the metal belonging to Group IVB, or a compound thereof, include titanium compound such as tetrapropyl titanate and the like; and zirconium compound such as zirconium isopropoxide and the like.

Examples of the catalyst comprising the metal belonging to Group VA, or a compound thereof, include antimony compounds such as antimony trioxide and the like; and bismuth compounds such as bismuth (III) oxide and the like.

Among them, the catalyst of tin or tin compound is particularly preferred in view of the activity.

The amount of these catalysts is generally about from 0.01 to 1.0% by mole based on the lactide according to a conventional process. In the present invention, the cyclic imide compound is added to the polymerization reaction system and, therefore, the amount may be comparatively small, e.g. 0.00001–0.1% by mole based on the lactide. By reducing the amount of the polymerization catalyst in such way, depolymerization of the polymer in the polymerization system can be inhibited, and remains of the catalyst in the polymer can be avoided. More preferred amount of the catalyst used is from 0.00001 to 0.01% by mole based on the lactide.

In the present invention, it is preferred to conduct the polymerization reaction at 100°–190° C. When the temperature is less than 100° C., the reaction proceeds slowly. On the other hand, when the temperature exceeds 190° C., the polymerization reaction generally proceeds rapidly but the polymer is likely to be colored. More preferred polymerization reaction temperature is from 120° to 160° C.

The time required for the polymerization reaction varies depending on the kind and amount of the cyclic imide compound, kind and amount of the polymerization catalyst, and polymerization reaction temperature, but is smaller than that in case where the cyclic imide compound is not included. That is, according to the present invention, polylactic acid can be efficiently obtained.

In the present invention, it is preferred to add a catalytic deactivator at the latter stage of the polymerization reaction.

Examples of the catalytic deactivator include phosphorous compound such as phosphoric acid, phosphorous acid, pyrophosphoric acid, trimethyl phosphate, trimethyl phosphate, triphenyl phosphite, triphenyl phosphate and the like; and oxidizing agent such as dibenzoyl peroxide and the like.

In the present invention, there can be optionally added known various additives such as stabilizer (e.g. calcium stearate, etc.), plasticizer (e.g. phthalic acid ester, etc.) and colorant (e.g. chrome yellow, titanium oxide, etc.) at the latter stage of the polymerization reaction.

In the present invention, the amount of the lactide in the synthesized polymer is preferably not more than 0.1% by weight in view of the quality (e.g. decomposition stability, etc.) of the product. Therefore, it is preferred to distill off the unreacted lactide from the reaction system under reduced pressure at the latter stage of the polymerization reaction.

According to the process of the present invention, the cyclic imide compound is added to the polymerization reaction system and, therefore, the amount of the polymerization catalyst can be reduced and depolymerization of the polymer can be inhibited, and remains of the catalyst in the polymer can be avoided. Also, the polymerization reaction can be conducted at comparatively low temperature and coloring of the polymer can be avoided.

EXAMPLES

The following Examples and Comparative Examples further illustrate the present invention in detail but are not to be construed to limit the scope thereof.

In the Examples and Comparative Examples, L-lactide manufactured by PURAC Co. and guaranteed reagents manufactured by Wako Pure Chemical Industries, Ltd. were used.

The analysis was conducted as follows.
<Weight average molecular weight(Mw) of polylactic acid>
It was measured by Gel Permeation Chromatography (GPC) under the following conditions.
Detector: RID-6A, pump: LC-9A, column oven: GTO-6A, column: Shim-pack GPC-801C, -804C, -806C and -8025C are arranged in series (manufactured by Shimadzu Corp.).
Solvent: chloroform, flow rate: 1 ml/min., amount of sample: 200 μl (sample (0.5 w/w %) was dissolved in chloroform), column temperature: 40° C.
<Yield of polylactic acid>
A predetermined amount of a sample was extracted from the reaction system and then dissolved in chloroform. The solution was charged in excess methanol to recrystallize a polymer. The yield was determined from the amount of the resulting crystal.

Example 1a

To a separable flask were added 500 g of L-lactide, 10% by mole (based on the lactide) of succinimide and 0.1% by mole of tin octylate as the catalyst, and then the polymerization reaction was conducted by heating with stirring in an oil bath at 120° C. under a nitrogen gas flow. Thirty minutes, sixty minutes, ninety minutes and hundred and twenty minutes after heating, sampling was conducted and the yield of polylactic acid was determined, respectively.

The results are shown in the graph of FIG. 1. That is, FIG. 1 is a graph illustrating the relation of the yield of polylactic acid (%) to the elapsed heating time (minute).

Examples 1b to 1d

According to the same manner as that described in Example 1a except for heating to 140° C. (Example 1b), 160° C. (Example 1c) or 180° C. (Example 1d), the polymerization reaction was conducted, respectively. Sampling was conducted at each time shown in FIG. 1 and the yield of polylactic acid was determined.

Comparative Examples 1a to 1d

According to the same manner as that described in Examples 1a to 1d except for adding no succinimide, the polymerization reaction was conducted and the yield of polylactic acid was determined, respectively. The reaction temperature is 120° C. (Comparative Example 1a), 140° C. (Comparative Example 1b), 160° C. (Comparative Example 1c) or 180° C. (Comparative Example 1d). The results are shown in the graph of FIG. 1.

As shown in the graph of FIG. 1, the effect of the addition of succinimide is not apparent at 180° C. when the catalytic amount is 0.1% by mole because the polymerization temperature itself is high. However, more remarkable improvement in yield of polylactic acid due to the addition of succinimide is recognized as the polymerization temperature becomes lower, e.g. 160°, 140° and 120° C.

In such way, the present process is particularly effective for the polymerization reaction at comparatively low temperature such as about 120°–60° C. at which without worrying polymer coloring.

Example 2a

To a separable flask were added 500 g of L-lactide, 10% by mole (based on the lactide) of succinimide and 1% by mole of tin octylate as the catalyst, and then the polymerization reaction was conducted by heating with stirring in an oil bath at 140° C. under a nitrogen gas flow.

Sampling was conducted at suitable time after heating, the time (hour) required for the yield of polylactic acid to reach 50% was determined.

Examples 2b to 2f

According to the same manner as that described in Example 2a except for changing the amount of tin octylate to 0.1% by mole (Example 2b), 0.01% by mole (Example 2c), 0.001% by mole (Example 2d), 0.0001% by mole (Example 2e) or 0.00001% by mole (Example 2f), the polymerization reaction was conducted and the time (hour) required for the yield of polylactic acid to reach 50% was determined, respectively.

Comparative Examples 2a to 2f

According to the same manner as that described in Examples 2a to 2f except for adding no succinimide, the polymerization reaction was conducted and the time (hour) required for the yield of polylactic acid to reach 50% was determined, respectively.

Figure 2:
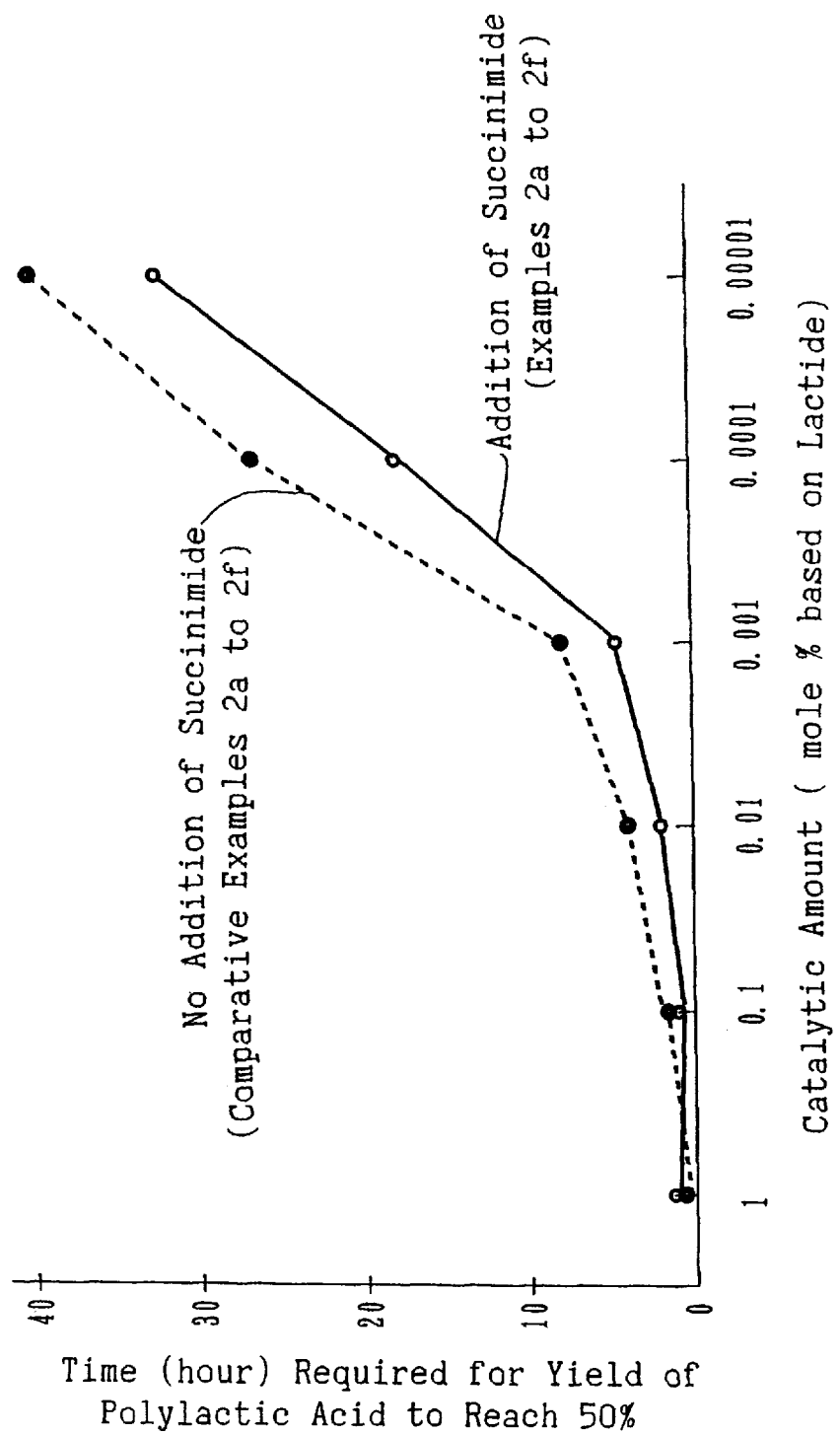
FIG. 2 shows the results of Examples 2a to 2f and Comparative Examples 2a to 2f, and is a graph illustrating the relation of the time (hour) required for the yield of polylactic acid to reach 50% to the catalytic amount (% by mole based on the lactide).

The results of Examples 2a to 2f and Comparative Examples 2a to 2f are shown in the graph of FIG. 2. That is, FIG. 2 is a graph illustrating the relation of the time (hour) required for the yield of polylactic acid to reach 50% to the catalytic amount (% by mole based on the lactide).

As shown in the graph of FIG. 2, the effect of the addition of succinimide is not apparent at 140° C. when thin octylate is 1% by mole because the catalytic amount is large. However, it is apparent that the formation rate of polylactic acid becomes higher by the addition of succinimide as the catalytic amount becomes smaller, e.g. 0.1% by mole, 0.01% by mole, 0.001% by mole, 0.0001% by mole and 0.00001% by mole.

In such way, the present process is particularly effective for the polymerization reaction in case where the catalytic amount is small.

Example 3a

To a separable flask were added 100 g of L-lactide, 0.1% by mole (based on the lactide) of succinimide and 0.001% by mole of tin octylate as the catalyst, and then the polymerization reaction was conducted by heating with stirring in an oil bath at 120° C. under a nitrogen gas flow for 24 hours. The yield and weight average molecular weight of the resulting polylactic acid were measured.

Examples 3b to 3g

According to the same manner as that described in Example 3a except for changing the amount of succinimide to 1% by mole (Example 3b), 5% by mole (Example 3c), 10% by mole (Example 3d), 25% by mole (Example 3e), 33% by mole (Example 3f) or 50% by mole (Example 3g) based on the lactide, the polymerization reaction was conducted for 24 hours and the yield and weight average molecular weight of the resulting polylactic acid were measured, respectively.

Comparative Example 3

According to the same manner as that described in Example 3a except for adding no succinimide, the polymerization reaction was conducted for 24 hours and the yield and weight average molecular weight of the resulting polylactic acid were measured.

The results of Examples 3a to 3g and Comparative Example 3 are shown in Table 1.

TABLE 1

| | Amount of Succinimide (mole %) | after 24 hours, 120° C. | |
|---|---|---|---|
| | | Yield (%) of Polylactic Acid | Mw of Polylactic Acid |
| Comparative Example 3 | 0 | 68 | 345,000 |
| Example 3a | 0.1 | 65 | 355,000 |
| Example 3b | 1 | 72 | 288,000 |
| Example 3c | 5 | 77 | 213,000 |
| Example 3d | 10 | 88 | 166,000 |
| Example 3e | 25 | 92 | 123,000 |
| Example 3f | 33 | 96 | 69,000 |
| Example 3g | 50 | 27 | 9,000 |

As is shown in Table 1, when succinimide is added in an amount of 1–33% by mole under the conditions of a catalytic amount of 0.001% by mole and a polymerization temperature of 120° C., the yield of polylactic acid is high, e.g. 72–96%, and the weight average molecular weight of polylactic acid is also high and is within the range from 10,000 to 300,000. When succinimide is added in an amount of 0.1% by mole, the effect of the addition is small (in comparison with Comparative Example 3). When succinimide is added in an amount of 50% by mole, the yield of polylactic acid is lowered and the molecular weight is also lowered. Accordingly, it is preferred to use succinimide in an amount of 1–33% by mole under the present conditions.

According to the preparing process of the present invention, the cyclic imide compound is added to the polymerization reaction system, as described above, so that polylactic acid can be efficiently prepared even under the mild conditions such as low polymerization catalytic amount and low polymerization temperature. Accordingly, depolymerization of the polymer can be inhibited, and remains of the catalyst in the polymer and coloring of the polymer can be avoided.

Polylactic acid obtained by the process of the present invention is very useful as a biodegradable resin for packaging, medical and agricultural applications.

What is claimed is:

1. A process for preparing polylactic acid by ring-opening polymerization of a lactide in the presence of a polymerization catalyst, said process comprising adding a cyclic imide to a polymerization reaction system.

2. The process for preparing polylactic acid according to claim 1, wherein an amount of the cyclic imide is from 1 to 35% by mole based on the lactide.

3. The process for preparing polylactic acid according to claim 2, wherein the cyclic imide is at least one selected from the group consisting of succinimide, glutarimide and phthalimide.

4. The process for preparing polylactic acid according to claim 3, wherein the cyclic imide is succinimide.

5. The process for preparing polylactic acid according to claim 4, wherein the polymerization catalyst comprising a metal selected from the group consisting of Group IA, IIIA, IVA, IIB, IVB and VA of the periodic table, or a compound thereof, is used.

6. The process for preparing polylactic acid according to claim 5, wherein an amount of the polymerization catalyst is from 0.00001 to 0.1% by mole based on the lactide.

7. The process for preparing polylactic acid according to claim 6, wherein the polymerization reaction is conducted at 100–190° C.

* * * * *